United States Patent [19]

Otstot et al.

[11] 4,378,981
[45] Apr. 5, 1983

[54] GAS SEPARATION APPARATUS

[75] Inventors: Roger S. Otstot; Charles J. Runkle, both of Raleigh, N.C.

[73] Assignee: Monsanto Company, St. Louis, Mo.

[21] Appl. No.: 332,640

[22] Filed: Dec. 21, 1981

[51] Int. Cl.³ .............................................. B01D 53/22
[52] U.S. Cl. .................................. 55/158; 210/321.1; 210/456
[58] Field of Search .................... 55/16, 158; 165/158; 210/321.1, 321.2, 321.3, 433.2, 456, 500.2

[56] References Cited

U.S. PATENT DOCUMENTS

| | | | |
|---|---|---|---|
| 3,291,314 | 12/1966 | Rosaen | 210/456 |
| 3,339,341 | 9/1967 | Maxwell et al. | 55/158 X |
| 3,363,680 | 1/1968 | Baker | 165/158 |
| 3,526,275 | 9/1970 | Vance et al. | 165/158 |
| 3,616,928 | 11/1971 | Rosenblatt | 55/158 X |
| 3,832,830 | 9/1974 | Gerow | 55/158 |
| 4,031,012 | 6/1977 | Gics | 55/158 X |
| 4,064,052 | 12/1977 | Zimmerly | 210/433.2 |
| 4,201,673 | 5/1980 | Kanno et al. | 210/456 X |
| 4,219,426 | 8/1980 | Spekle et al. | 210/456 X |
| 4,334,993 | 6/1982 | Norton | 55/158 X |
| 4,341,631 | 7/1982 | Hargitay | 210/433.2 X |

Primary Examiner—Robert H. Spitzer
Attorney, Agent, or Firm—Robert L. Broad

[57] ABSTRACT

Apparatus for separating one gas from a mixture of gases wherein a cylindrical shell having an enlarged end portion houses a bundle of hollow fiber membranes, the hollow fiber membranes extending through a polymeric tube sheet positioned in and secured to the enlarged end portion of the shell. A tubular distribution element secured to the tube sheet and extending into the cylindrical shell cooperates with the tube sheet and the enlarged end portion of the shell to form an annular chamber surrounding the distribution element. The distribution element is provided with a port positioned between the tube sheet and a gas inlet in the enlarged end portion of the shell, the port being positioned such that $$0.4 \leq l/D \leq 1.3$$

$$0.2 \leq d/D \leq 0.6$$

where d is the distance from the tube sheet to the port; l is the distance from the tube sheet to the inlet opening and D is the diameter of the bundle of hollow fiber membranes.

6 Claims, 1 Drawing Figure

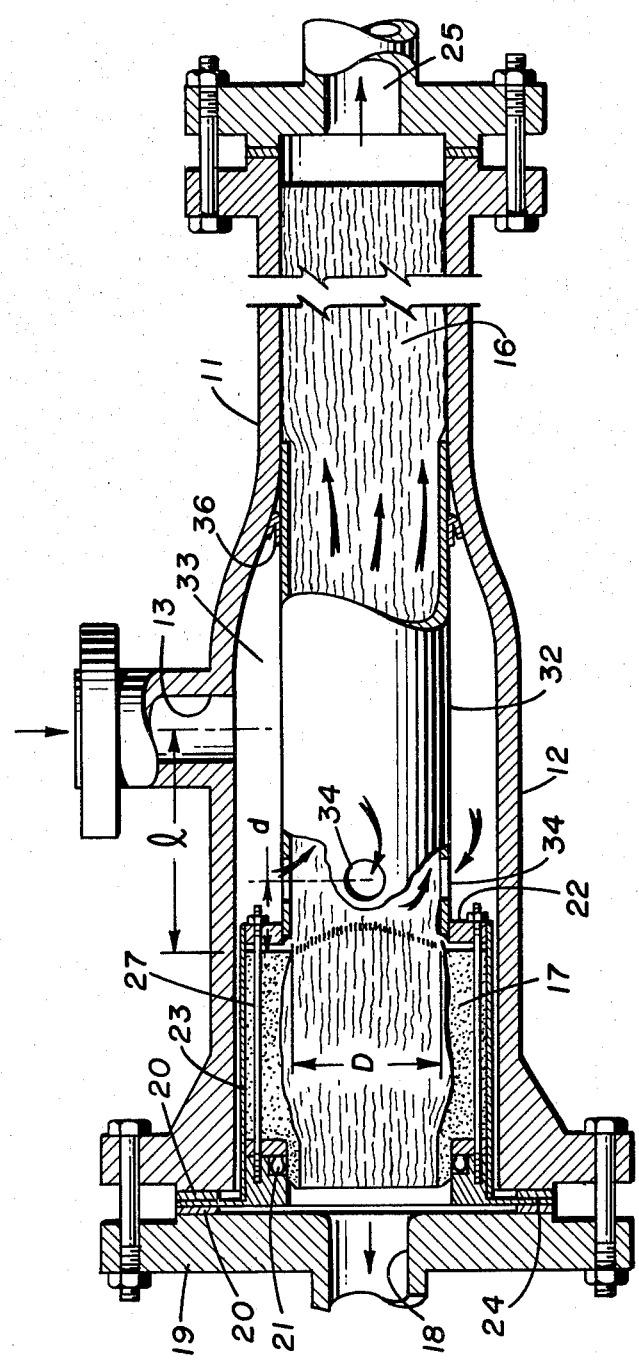

GAS SEPARATION APPARATUS

BACKGROUND OF THE INVENTION

A. Field of the Invention

This invention relates to apparatus for separating one gas from a mixture of gases.

B. Prior Art

U.S. Pat. No. 3,339,341 discloses fluid separation apparatus wherein a cylindrical shell having an enlarged end portion houses a plurality of tubular separation elements. A gas mixture to be treated is fed into the shell from the end thereof and the permeated fluid is withdrawn through a side wall of the shell.

U.S. Pat. No. 3,832,830 discloses permeation apparatus for separating a fluid from a mixture of fluids wherein a cylindrical shell having enlarged end portions surrounds a bundle of hollow fiber membranes which pass through cast resin tube sheets at the ends of the shell. Elastic retaining elements and flexible porous sleeves are used to confine the bundle of fibers adjacent to the tube sheets for preventing breakage of these fibers.

U.S. Pat. No. 3,526,275 discloses a heat exchanger wherein a perforated sleeve surrounds a bundle of tubular heat exchange elements mounted in a cylindrical shell. One of the heat exchange fluids passes into the bundle of tubes through openings in the sleeve and then exits through other openings in the sleeve.

SUMMARY OF THE INVENTION

Apparatus for separating a gas from a mixture of gases wherein a bundle of hollow fiber membranes extending through a polymeric tube sheet is positioned in a cylindrical shell having an enlarged end portion, the tube sheet being secured to the enlarged end portion of the shell. A tubular distribution element secured to the tube sheet extends into the cylindrical shell and is provided with an inlet port positioned between the face of the tube sheet and a gas inlet in the enlarged end portion of the shell such that $$0.4 \leq l/D \leq 1.3$$

$$0.2 \leq d/D \leq 0.6$$

where d is the distance from the tube sheet to the port, l is the distance from the tube sheet to the gas inlet and D is the diameter of the bundle of hollow fiber membranes.

DESCRIPTION OF THE DRAWING

The single FIGURE is a cross-sectional view of gas separation apparatus showing the positioning of a tubular gas distribution element inside an enlarged end portion of a cylindrical shell housing the apparatus.

DETAILED DESCRIPTION OF THE INVENTION

Referring now in detail to the drawing, there is shown a cylindrical steel shell 11 having an enlarged end portion 12 which is provided with an inlet opening 13 for the admission of a mixture of gases to the interior of the shell. The shell surrounds a bundle 16 of hollow fiber membranes of a known type, these membranes having a greater permeability for one gas of a mixture than the other gases of the mixture.

The hollow fibers 16 extend through a polymeric tube sheet 17 in such a manner that the gas which permeates from the outside of the fibers to the bores thereof is free to pass through the tube sheet for recovery, this gas being taken out through an exit opening 18 in a cover plate 19 bolted to the enlarged end portion of the shell. The other ends of the fibers are sealed. Gaskets 20 and a seal 21 serve to prevent leakage of the gases. The non-permeated gas exits from the shell through an outlet opening 25.

A ring 22 is secured to the tube sheet by bolts 27, the ring being welded to a tubular element 23 which surrounds and protects the tube sheet. The tubular element 23 is provided with a flange 24 positioned and held between the gaskets 20 for supporting the tube sheet 17. A tubular distribution element 32 welded to the ring 22 and surrounding the fiber bundle 16 extends into the cylindical shell 11 and cooperates with the tube sheet and the enlarged end portion of the shell to form an annular chamber 33 surrounding the distribution element.

The distribution element is provided with a plurality of inlet ports 34 around the periphery thereof in a plane perpendicular to the axis of the shell 11 and at a location between the face of the tube sheet and the center of the gas inlet 13. The positioning of the ports 34 is such that $$0.4 \leq l/D \leq 1.3$$

$$0.2 \leq d/D \leq 0.6$$

where d is the distance from the tube sheet to the ports, l is the distance from the tube sheet to the inlet opening 13 and D is the diameter of the fiber bundle at the face of the tube sheet.

The positioning of the ports 34 in this manner protects the fiber 16 from eroding effects of the gas entering the inlet 13 and at the same time protects the more fragile portions of the fibers adjacent to the tube sheet from impingement by the moving gas mixture.

If the ports 34 are too close to the inlet 13, the gas stream entering the inlet 13 at a high velocity may not only erode the fibers but may also damage them by rapidly moving them back and forth. It is also essential that the ports 34 not be too close to the face of the tube sheet from which the fibers extend. The tube sheet is formed by suspending the fiber bundle above a mold and pouring a liquid casting resin into the mold. Some of the casting resin will wick up through the spaces between the fibers before and during the curing of the resin, with wicking being greatest in the center of the fiber bundle. It is in this wicked region that the fibers are most brittle and the most easily damaged.

The distance at the resin wicks along the fiber bundle is dependent on the diameter of the bundle, with the distance the resin wicks increasing with fiber bundle diameter. It has been found that the positioning of the ports 34 as described herein substantially eliminates both fiber erosion and fiber breaking at or near the face of the tube sheet.

A seal 36 mounted on the tubular distribution element 32 and in contact with the inner surface of the shell 11 prevents leakage of the gas mixture between the tubular element 32 and the shell 11.

In operation, the gas mixture enters the chamber 33 through the inlet 13 in the enlarged end portion 12 of the shell 11 and passes through the ports 34 into the bundle of fibers 16. The gas mixture then passes through the spaces between the fibers 16 and along the shell 11, the more permeable gas permeating through the fiber walls to the bores and being removed from the apparatus through the exit opening 18. Non-permeated gases leave the apparatus through the outlet opening 25.

What is claimed is:

1. Apparatus for separating one fluid from a mixture of fluids comprising
   (a) a cylindrical shell having an enlarged end portion, said end portion having therein an inlet for admitting said fluid mixture;
   (b) a bundle of hollow fibers positioned in the shell, said fibers being more permeable to said one fluid than other fluids of the mixture;
   (c) a tube sheet secured to the enlarged end of the shell for closing said end portion, said hollow fibers extending through said tube sheet, and
   (d) a tubular distribution element mounted in the enlarged end portion of the shell and extending the length of said enlarged end portion, said distribution element cooperating with said enlarged end portion and the tube sheet to form an annular chamber surrounding said element, said element having therein a port so positioned that $$0.4 \leq l/D \leq 1.3$$

$$0.2 \leq d/D \leq 0.6$$

where d is the distance from the tube sheet to said port, l is the distance from the tube sheet to said inlet and D is the diameter of the bundle of fibers.

2. The apparatus of claim 1 wherein the distribution element is secured to the tube sheet.

3. The apparatus of claim 2 wherein the distribution element extends into the cylindrical shell.

4. The apparatus of claim 3 wherein the distribution element is provided with a plurality of said ports positioned in a plane perpendicular to the axis of the cylindrical shell.

5. The apparatus of claim 4 wherein the apparatus is provided with a seal positioned in contact with the tubular distribution element and the inner surface of the shell for preventing leakage of the fluid between the tubular element and the shell.

6. Apparatus for separating one fluid from a mixture of fluids, comprising
   (a) a cylindrical shell having an enlarged end portion,
   (b) a tube sheet positioned in the enlarged end portion of the shell, said end portion having a fluid mixture inlet,
   (c) a bundle of hollow fiber membranes positioned in the shell and extending through the tube sheet,
   (d) a ring secured to the tube sheet,
   (e) a tubular distribution element secured to the ring in a position surrounding the bundle of fibers, said distribution element extending into the cylindrical shell, said distribution element cooperating with the tube sheet and the enlarged end portion of the shell to form an annular chamber surrounding the distribution element, and
   (f) a seal mounted on the distribution element in contact with the shell for preventing leakage of the fluid mixture between the distribution element and the shell,
   (g) said distribution element having a plurality of inlet ports arranged in a plane perpendicular to the axis of the distribution element, said plane being positioned such that $$0.4 \leq l/D \leq 1.3$$

$$0.2 \leq d/D \leq 0.6$$

where d is the distance of the tube sheet to said plane, l is the distance from the tube sheet to the fluid mixture inlet and D is the diameter of the bundle of fibers.

* * * * *